United States Patent [19]

Iino et al.

[11] Patent Number: 5,025,845
[45] Date of Patent: Jun. 25, 1991

[54] PNEUMATIC BIAS TIRE WITH CARCASS PLIES HAVING DIFFERENT CORD ANGLE

[75] Inventors: Hiroshi Iino, Minami-ashigara; Shinichi Mori, Hiratsuka, both of Japan

[73] Assignee: The Yokohama Rubber Co., Ltd., Tokyo, Japan

[21] Appl. No.: 501,820

[22] Filed: Mar. 28, 1990

[51] Int. Cl.$^5$ ............................ B60C 9/04; B60C 9/06
[52] U.S. Cl. .................................. 152/559; 152/557; 152/558
[58] Field of Search ............... 152/559, 558, 557, 552, 152/554

[56] References Cited

U.S. PATENT DOCUMENTS

| | | | |
|---|---|---|---|
| 3,630,258 | 12/1971 | Sperberg | 152/559 X |
| 4,715,420 | 12/1987 | Kabe et al. | 152/559 X |
| 4,832,103 | 5/1989 | Slivka et al. | 152/559 |

OTHER PUBLICATIONS

*Engineering Materials, Properties and Selection,* Kenneth Budinski: Reston, Va., Reston Publishing Company, Inc., 1983, pp. 66–68.

Primary Examiner—Michael W. Ball
Assistant Examiner—Adrienne C. Johnstone
Attorney, Agent, or Firm—Armstrong, Nikaido, Marmelstein, Kubovcik & Murray

[57] ABSTRACT

A pneumatic bias tire including a two-ply carcass layer comprising an inner carcass ply and an outer carcass ply, which respectively comprise cords of an aromatic polyamide fiber and cords of nylon, the cords of the inner carcass ply crossing the cords of the outer carcass ply, the outer carcass ply having a cord angle $\beta$ to the circumferential direction of the tire which is smaller than a cord angle $\alpha$ of the inner carcass ply to the tire circumferential direction.

5 Claims, 2 Drawing Sheets

PNEUMATIC BIAS TIRE WITH CARCASS PLIES HAVING DIFFERENT CORD ANGLE

BACKGROUND OF THE INVENTION

The present invention relates to a pneumatic bias tire incorporating a carcass layer utilizing an aromatic polyamide fiber cord, which can exhibit remarkable steering stability and high-speed durability.

Pneumatic bias tires utilizing an aromatic fiber cord for carcass ply cords are known per se. For instance, Japanese patent publication No. 57-12586 discloses an example of such tires. Aromatic polyamide fiber cords have a high tenacity and a high modulus of elasticity, and the bias tire incorporating such cords, disclosed in the above patent publication, can exhibit a remarkable tire performance including a remarkable steering stability in particular and, because of this, has already been industrially produced particularly in the product form of pneumatic tires for racing cars.

Although aromatic polyamide fiber cords can exhibit highly desirable cord characteristics as above, their bondability with or adhesion to rubber is relatively limited, and due to this, their characteristic of having a high modulus of elasticity tends to take a negative or disadvantageous effect in tires and cause them to undergo rupture through buckling. Therefore, particularly in the cases of racing-car tires which are run under severe service conditions of for example running at a super high speed, problems are likely such as separation of carcass ply cords and bursting, and the known tires incorporating an aromatic fiber cord tend to involve a difficulty to do with the high-speed durability.

SUMMARY OF THE INVENTION

Therefore, it is a primary object of the present invention to provide a pneumatic bias tire which has an improved high-speed durability and yet can fully exhibit the effect of improvement of its steering stability brought about by the utilization of an aromatic polyamide fiber cord.

It is also an object of the invention to provide a pneumatic bias tire for racing cars which is highly desirable with respect to both of the steering stability and the high-speed durability.

The pneumatic bias tire to attain the above objects according to the present invention includes a two ply carcass layer comprising an inner carcass ply and an outer carcass ply, in which the inner carcass ply comprises aromatic polyamide fiber cords, while the outer carcass ply comprises nylon cords, the cords in the inner carcass ply and those in the outer carcass ply cross one another, and the cords in the outer carcass ply has a cord angle $\beta$ to the circumferential direction of the tire, which is smaller than a cord angle $\alpha$ which the cords in the inner carcass layer have relative to the tire circumferential direction.

DETAILED DESCRIPTION OF THE PREFERRED EMBODIMENT

Figure 1:
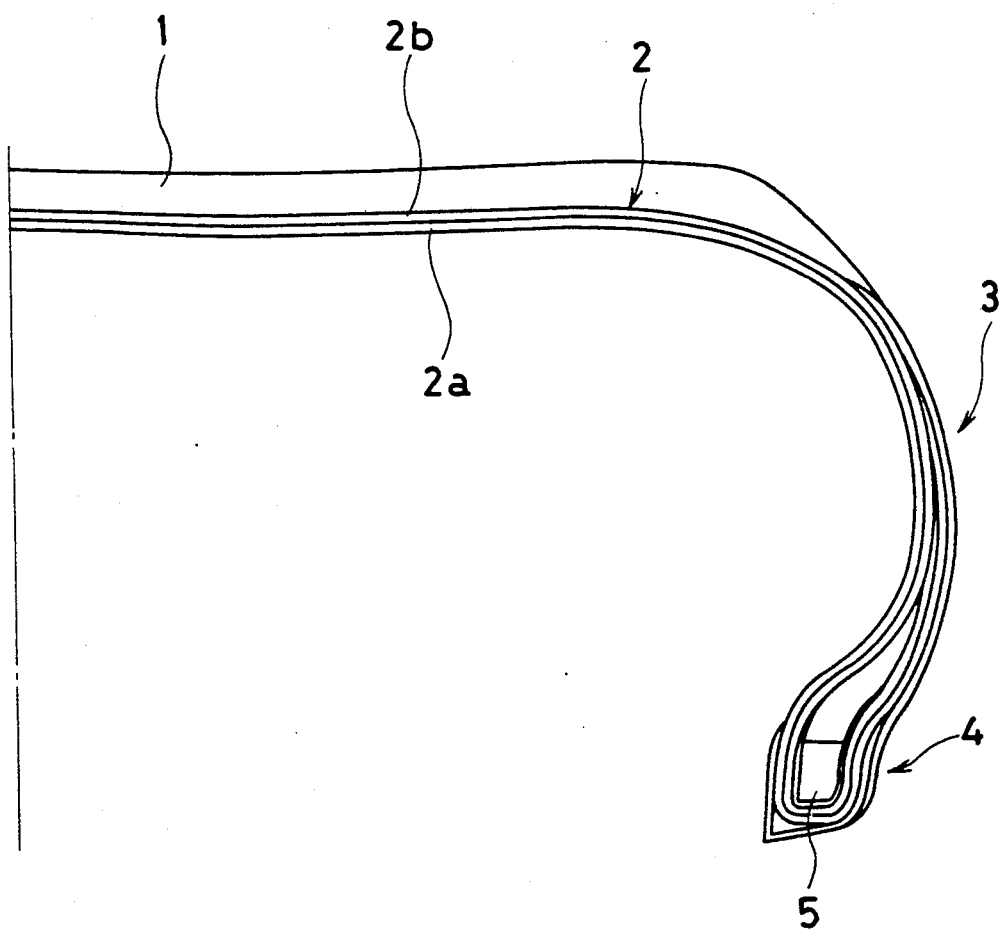
FIG. 1 shows a sectional view of a half portion of a pneumatic bias tire embodying the present invention.
Figure 2:
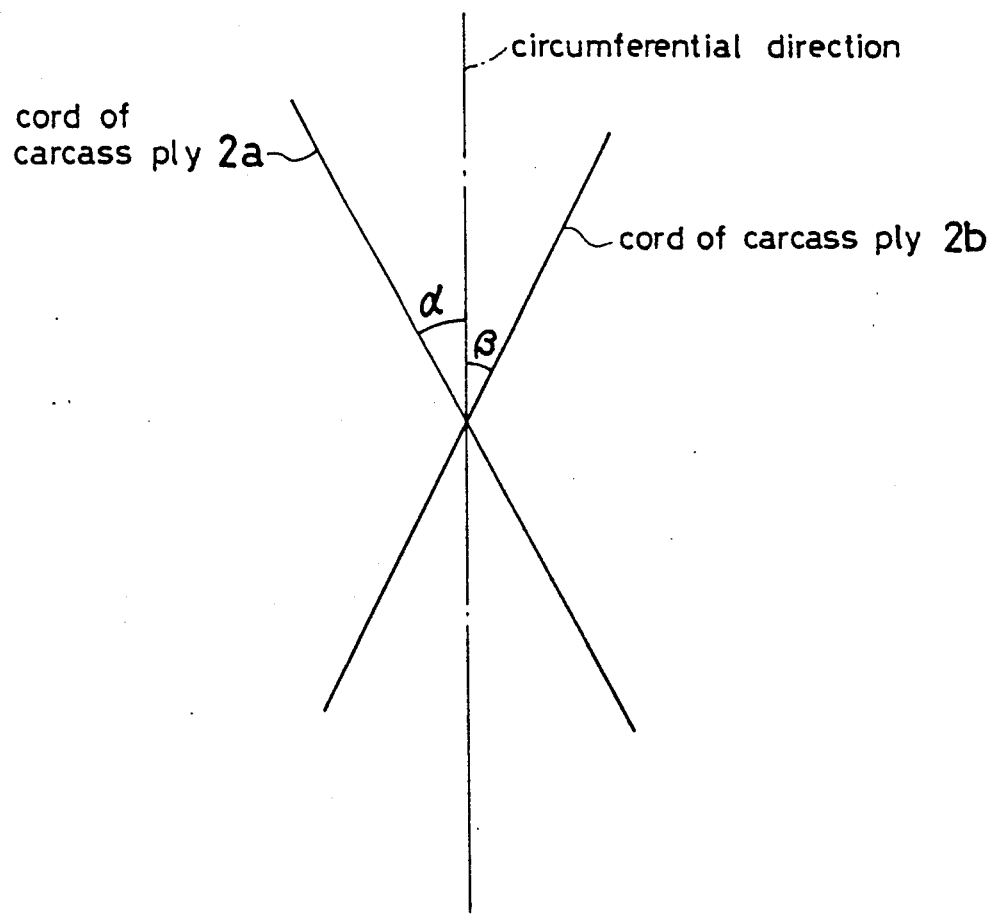
FIG. 2 shows a diagram of the cord angles relative to the circumferential direction of the tire according to the present invention.

As illustrated in the drawings, the tire according to the present invention comprises a sidewall portion 3 and a bead portion 4 on each side of a tread portion 1. The carcass layer shown at 2 has a two ply structure comprising an inner carcass ply 2a disposed on the inner side of the tire and an outer carcass ply 2b disposed on the side of the inner carcass ply 2a closer to the tread portion 1. Each of the inner and the outer carcass plies 2a and 2b extends over a whole of the meridian section of the tire through the sidewall portion 3 and the bead portion 4 in each meridian half portion of the tire, and has its respective ends turned up around a bead core 5 of the bead portion 3 from the inner side towards the outer side of the tire. The outer carcass ply 2b has respective turnup ends located in the vicinity of a maximum width region of the tire, while the inner carcass ply 2a has respective turnup end portions covering the turnup end of the outer carcass ply 2b and ending at a location above the turnup end of the outer carcass ply 2b.

In the tire according to the invention, the inner carcass ply comprising cords of an aromatic polyamide fiber takes the effect of improving the mechanical strength and the dimensional stability of the carcass layer constituting the skelton of a tire as a high pressure vessel and thereby improving the tire performance characteristics such as the steering stability, particularly that at times of a high-speed running. On the other hand, nylon cords having a remarkable adhesion to or bondability with rubber, the outer carcass ply comprising nylon cords can integrally adhere to the inner carcass ply and also can strongly adhere to a rubber layer of the outer located tread portion and a rubber layer of the sidewall portion. Using an outer carcass ply comprising nylon cords as above, an inner carcass ply comprising aromatic polyamide fiber cords can be integrally joined to the tread portion and the sidewall portion, so that the generation of a separation trouble of the aromatic polyamide fiber cords and that of a rupture due to buckling can be effectively suppressed.

Also in the tire according to the invention, as earlier stated the cord angle $\beta$ of the outer carcass ply relative to the tire circumferential direction is set smaller than the cord angle $\alpha$ of the inner carcass ply relative to the tire circumferential direction. Nylon cords have a higher ratio of heat shrinkage than aromatic polyamide fiber cords, so that if the above cord angles $\alpha$ and $\beta$ (cord angles of nylon cords and aromatic polyamide fiber cords, respectively) are set identical with each other, then the inner carcass ply comprising aromatic polyamide fiber cords are prone to undergo an influence of shrinking behavier of the outer carcass ply comprising nylon cords during vulcanization of the tire and the desirable characteristic of the aromatic polyamide fiber cord tends to be lost or reduced. Thus, the cord angle $\beta$ of the nylon cord should be set smaller than the cord angle $\alpha$ of the aromatic polyamide fiber cord. If it is met, then it is possible to suppress the difference in the dimensional change between the inner and the outer carcass plies likely due to a difference in the heat shrinkage between the inner and the outer cords at the time of vulcanization of the tire and attain an improvement in or relating to the tire building efficiency. It is also possible to permit the desirable characteristic of an aromatic polyamide fiber cord to be fully reflected on the tire performance, and as a result of this, it is possible to improve the steering stability of pneumatic bias tires, and in accordance with this, shorten lap times which vehicles, particularly racing cars, may take.

To permit the above described advantageous effect or results according to the present invention to be further effectively demonstrated, preferably the cord angle α of the inner carcass ply should be set within a range of 26° to 32°, while the cord angle β of the outer carcass ply is set within a range of 24° to 30°, and the difference between the two cord angles, α−β, is to be limited to be 1° to 4°. Also, preferably the total denier number of nylon cords should be greater than the total denier number of aromatic polyamide fiber cords, and respective cord plies should have a same end count.

The above described preferred arrangements of cords in the inner carcass ply and the outer carcass ply can take a particularly remarkable effect in the cases of racing-car bias tires having an aspect ratio of 30 to 60%. Although racing-car bias tires having such a high aspect ratio is possessed of a flat profile having a very large tread radius of 800 to 1500 mm and a relatively broad contact area, if the above described ply arrangement is made in such tires, then it is possible to ideally provide such flat tire profile.

The aromatic polyamide fiber cord for use for or in the present invention is for example poly-p-phenyleneterephthalamide fiber cord, while useful nylon cords may be any of aliphatic polyamide fiber cords to be represented by cords of nylon 66 and nylon 6, preferably nylon 66 fiber cord.

As described above, according to the present invention an outer carcass ply comprising nylon cords is utilized in a pneumatic bias tire, and thereby the desirable cord properties of an aromatic polyamide fiber cord can be reflected in a desirably balanced state on the tire performance to improve the steering stability of the tire, so that it is possible to shorten lap times which vehicles mounting pneumatic bias tires thereon take when they are run. In addition, an outer carcass ply comprising nylon cords having a remarkable adhesion to rubber is arranged on the outer side of the inner carcass ply to improve the adhesion of the inner carcass ply, so that the separation and rupture of the aromatic polyamide fiber cord due to buckling can be suppressed to bring about an improvement in or relating the high-speed durability. Further, as before described, it is sufficient according to the present invention if the carcass consists of two plies only, so that such as an undesirable increase in the weight of tires, a complication of tire building steps and an impairing of the tire production efficiency can all be effectively avoided.

EXAMPLES:

There were produced three different tires as shown in the below table, namely a tire of the present invention and comparative tires I and II, which commonly had a section structure as shown in the appended FIG. 1 but of which the cords of the inner carcass ply and the outer carcass ply and cord angles α and β were varied as also shown in the below table.

In the above produced tires, for the inner carcass ply, use was made of a ply comprising 1500 D/2 poly-p-phenyleneterephthalamide fiber cords and having an end count of 49 cords/5 cm width, and for the outer carcass ply, use was made of a ply comprising 1890 D/2 nylon 66 fiber cords and having an end count of 44 cords/5 cm width. Further, each of the tires was made in respective tire sizes of 180/515-13 (aspect ratio: 50%) and 210/570-13 (aspect ratio: 55%).

In connection with each of the three different tires, the following described steering stability test on an actual car was carried out by a racing driver, and lap time measurements and steering stability evaluations (by feeling) were conducted.

Steering Stability Test

Testing Car: an RJ 1600 Class racing car
Front Tires:
  tire size: 180/515-13
  front rim size: 13×8JJ
Rear Tires:
  tire size: 210/570-13
  rear rim size: 13×10 JJ Further, test results are shown in the below table in terms of indices, taking the test result found of the comparative tire II as 100 (reference value). A larger index value represents a more desirable performance.

Also, in connection with each of the three different tires having the tire size of 210/570-13 (rim size: 13×10 JJ), a high-speed durability test was conducted on an indoor drum under the conditions of an inflation pressure of 1.0 kg/cm$^2$ and a load of 450 kg.

Test results are shown in the below table in terms of indices, taking the test result found of the comparative tire II taken as 100 (reference value). A larger index value represents a better high-speed durability.

|  | Comparative Tire I | Comparative Tire II | Tire of Invention |
|---|---|---|---|
| Inner Carcass Ply | nylon 66 | aromatic polyamide fiber cords | aromatic polyamide fiber cords |
| Outer Carcass Ply | nylon 66 | aromatic polyamide fiber cords | nylon 66 |
| Cord Angle α | 29° | 29° | 29° |
| Cord Angle β | 27° | 27° | 27° |
| α - β | 2° | 2° | 2° |
| Lap Time | 97 | 100 | 100 |
| Steering Stability | 95 | 100 | 101 |
| High-Speed Durability | 110 | 100 | 112 |

From the above table, it is seen that with respect to the lap time and the steering stability, the comparative tire II is superior to comparative tire I but is inferior to the comparative tire I with respect to the high-speed durability. It is also seen that the tire of the invention is not only of a same level as the comparative tire II with respect to the lap time and the steering stability but is it also superior to the comparative tire II with respect to the high-speed durability.

What is claimed is:

1. A pneumatic bias tire including a two-ply carcass layer comprising an inner carcass ply and an outer carcass ply, in which the inner carcass ply comprises cords of an aromatic polyamide fiber, while the outer carcass ply comprises cords of nylon, the cords of the inner carcass ply crossing the cords of the outer carcass ply, the outer carcass ply having a cord angle β to the circumferential direction of the tire which is smaller than a cord angle α of the inner carcass ply to the tire circumferential direction.

2. A tire as claimed in claim 1, wherein respective ends of each of the inner carcass ply and the outer carcass ply are turned up around a bead core from the inner side to the outer outer side of the tire, the outer carcass ply having its respective turnup ends located in the vicinity of a maximum width region of the tire, the inner carcass ply having respective turnup end portions covering the corresponding turnup end of the outer carcass ply and ending above the location of the respective turnup ends of the outer carcass ply.

3. A tire as claimed in claim 1, wherein the cord angle $\alpha$ of the inner carcass ply to the tire circumferential direction is 26° to 32° and the cord angle $\beta$ of the outer carcass ply to the tire circumferential direction is within a range of 24° to 30°, the cord angles $\alpha$ and $\beta$ having a difference of $\alpha - \beta$, which is 1° to 4°.

4. A tire as claimed in claim 1, wherein the nylon cords have a total denier number greater than that of the aromatic polyamide fiber cords, and end count of the former cords and that of the latter cords are substantially the same.

5. A tire as claimed in claim 1, which is a tire for racing cars, having an aspect ratio of 30 to 60%.

* * * * *